United States Patent
Patel et al.

(10) Patent No.: US 12,522,193 B1
(45) Date of Patent: Jan. 13, 2026

(54) TECHNIQUES FOR UTILIZING A TORQUE CONVERTER QUADRATIC MODEL TO DETERMINE A MAXIMUM POWERTRAIN TORQUE CAPABILITY

(71) Applicant: FCA US LLC, Auburn Hills, MI (US)

(72) Inventors: Nadirsh D Patel, Auburn Hills, MI (US); Hangxing Sha, Auburn Hills, MI (US); Krishna Chaitanya Reddy Madireddy, Auburn Hills, MI (US); Harshal Sudhir Kudupley, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 19/171,491

(22) Filed: Apr. 7, 2025

(51) Int. Cl.
  *B60W 10/06* (2006.01)
  *B60W 10/08* (2006.01)
  *G01M 17/007* (2006.01)

(52) U.S. Cl.
  CPC ........... *B60W 10/06* (2013.01); *B60W 10/08* (2013.01); *G01M 17/0074* (2013.01); *B60W 2510/105* (2013.01)

(58) Field of Classification Search
  CPC ..... B60W 10/06; B60W 10/08; B60W 10/024
  See application file for complete search history.

(56) References Cited

U.S. PATENT DOCUMENTS

| | | | |
|---|---|---|---|
| 6,052,640 A * | 4/2000 | Wu | B60W 30/1819 701/87 |
| 7,908,066 B2 | 3/2011 | Graf et al. | |
| 8,050,856 B2 | 11/2011 | Duty et al. | |
| 10,597,022 B2 | 3/2020 | Wang et al. | |
| 12,370,996 B1 * | 7/2025 | Patel | B60W 10/08 |
| 2008/0026908 A1 * | 1/2008 | Matthews | B60W 10/023 477/110 |
| 2023/0182712 A1 | 6/2023 | Yun et al. | |

FOREIGN PATENT DOCUMENTS

| | | | | |
|---|---|---|---|---|
| CN | 113868774 A | | 12/2021 | |
| DE | 10338623 A1 * | | 3/2005 | F16H 59/14 |

* cited by examiner

*Primary Examiner* — Stacey A Fluhart
(74) *Attorney, Agent, or Firm* — Jeremy J. Klobucar

(57) ABSTRACT

A powertrain control method for a vehicle includes determining, based on empirical operation data for a powertrain, maximum torques for the torque generating system at each of a plurality of breakpoints corresponding to different impeller speeds for a torque converter and different speeds of a torque generating system, identifying, between two particular breakpoints, (i) a linear intersection point between the maximum torque and the impeller speed for the torque converter and (ii) an intersection region between the two particular breakpoints, determining a quadratic polynomial representation of the impeller speed for the torque converter across the intersection region based on the empirical operation data for the torque converter, and utilizing the quadratic polynomial representation of the impeller speed for the torque converter across the intersection region for improved control of the powertrain.

18 Claims, 4 Drawing Sheets

TECHNIQUES FOR UTILIZING A TORQUE CONVERTER QUADRATIC MODEL TO DETERMINE A MAXIMUM POWERTRAIN TORQUE CAPABILITY

FIELD

The present application generally relates to vehicle powertrains and, more particularly, to techniques for utilizing a torque converter quadratic model to determine a maximum powertrain torque capability.

BACKGROUND

Some electrified vehicles have electrified powertrains comprising at least one high voltage electric traction motor and an internal combustion engine selectively connectable in series and a torque converter arranged between these actuators and a transmission/gearbox and a driveline of the electrified vehicle. The torque converter is a fluid coupling device, in which an input shaft drives an impeller blade, which fluidly drives a turbine blade and an output shaft. Due to the fluid physics of the torque converter, its behavior is somewhat difficult to quantify. In one approach, a complex torque converter model (e.g., a neural network model) could be generated and utilized by a controller, but this is time-consuming and computationally expensive. In another approach, the behavior of the torque converter can be estimated based on predetermined empirical data. Inaccurate estimation, however, can result in decreased performance of the electrified powertrain. Accordingly, while these conventional approaches do work for their intended purpose, there exists an opportunity for improvement in the relevant art.

SUMMARY

According to one example aspect of the invention, a powertrain control system for a vehicle is presented. In one exemplary implementation, the powertrain control system comprises a memory configured to store empirical operation data for a powertrain of the vehicle, the powertrain comprising a torque generating system including at least one of an electric traction motor and an engine connectable in series at an input of a torque converter and a control system configured to determine, based on the empirical operation data, maximum torques for the torque generating system at each of a plurality of breakpoints corresponding to different impeller speeds for the torque converter and different speeds of the torque generating system, identify, between two particular breakpoints, (i) a linear intersection point between the maximum torque and the impeller speed for the torque converter and (ii) an intersection region between the two particular breakpoints, determine a quadratic polynomial representation of the impeller speed for the torque converter across the intersection region based on the empirical operation data for the torque converter, and utilize the quadratic polynomial representation of the impeller speed for the torque converter across the intersection region for improved control of the powertrain.

In some implementations, the control system is further configured to determine coefficients for the quadratic polynomial representation based on the empirical operation data for the powertrain. In some implementations, the control system is further configured to determine the linear intersection point from the particular breakpoint corresponding to a higher speed of the torque generating system. In some implementations, the empirical operation data is obtained via dynamometer testing of the vehicle.

In some implementations, the improved control of the powertrain includes greater torque of the torque generating system compared to an assumption of linear behavior of the torque generating system between each of the plurality of breakpoints. In some implementations, the control system is further configured to increase both the impeller speed for the torque converter and a torque output of the torque generating system across the intersection region. In some implementations, the torque generating system comprises the engine and at least two electric traction motors. In some implementations, the plurality of breakpoints comprises only the two particular breakpoints. In some implementations, the control system does not utilize a complete model of the torque converter.

According to another example aspect of the invention, a powertrain control method for a vehicle is presented. In one exemplary implementation, the powertrain control method comprises storing, by a memory associated with a control system of the vehicle, empirical operation data for a powertrain of the vehicle, the powertrain comprising a torque generating system including at least one of an electric traction motor and an engine connectable in series at an input of a torque converter, determining, by the control system and based on the empirical operation data, maximum torques for the torque generating system at each of a plurality of breakpoints corresponding to different impeller speeds for the torque converter and different speeds of the torque generating system, identifying, by the control system and between two particular breakpoints, (i) a linear intersection point between the maximum torque and the impeller speed for the torque converter and (ii) an intersection region between the two particular breakpoints, determining, by the control system, a quadratic polynomial representation of the impeller speed for the torque converter across the intersection region based on the empirical operation data for the torque converter, and utilizing, by the control system, the quadratic polynomial representation of the impeller speed for the torque converter across the intersection region for improved control of the powertrain.

In some implementations, the powertrain control method further comprises determining, by the control system, coefficients for the quadratic polynomial representation based on the empirical operation data for the powertrain. In some implementations, the powertrain control method further comprises determining, by the control system, the linear intersection point from the particular breakpoint corresponding to a higher speed of the torque generating system. In some implementations, the empirical operation data is obtained via dynamometer testing of the vehicle.

In some implementations, the improved control of the powertrain includes greater torque of the torque generating system compared to an assumption of linear behavior of the torque generating system between each of the plurality of breakpoints. In some implementations, the powertrain control method further comprises increasing, by the control system, both the impeller speed for the torque converter and a torque output of the torque generating system across the intersection region. In some implementations, the torque generating system comprises the engine and at least two electric traction motors. In some implementations, the plurality of breakpoints comprises only the two particular breakpoints. In some implementations, the control system does not utilize a complete model of the torque converter.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, some electrified vehicles have electrified powertrains comprising at least one high voltage electric traction motor and an internal combustion engine selectively connectable in series and a torque converter arranged between these actuators and a transmission/gearbox and a driveline of the electrified vehicle. Due to the fluid physics of the torque converter, its behavior is somewhat difficult to quantify. In one approach, a complex torque converter model (e.g., a neural network model) could be generated and utilized by a controller, but this is time-consuming and computationally expensive. In another approach, the behavior of the torque converter can be estimated based on predetermined empirical data. Inaccurate estimation, however, can result in decreased performance of the electrified powertrain. Accordingly, while these conventional approaches do work for their intended purpose, there exists an opportunity for improvement in the relevant art.

Figure 1A:
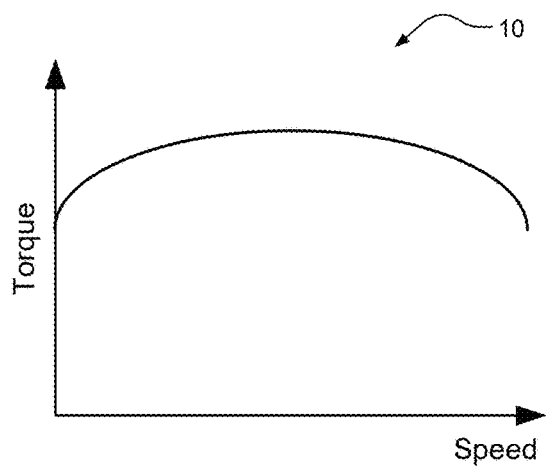
FIGS. 1A-1C are plots of a first example electrified powertrain capability determination and control utilizing torque converter empirical data and a plurality of breakpoints according to the principles of the present application.
Figure 1B:
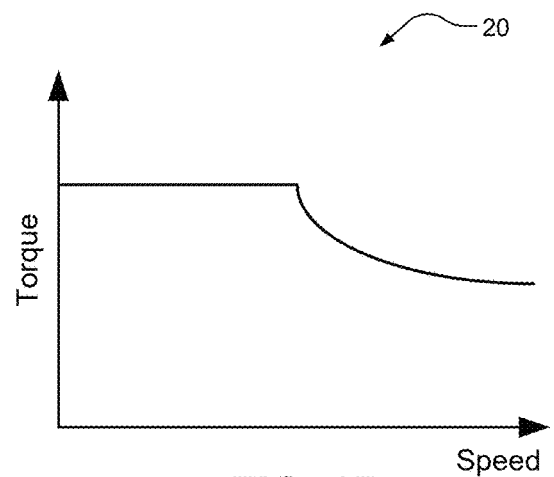
Figure 1C:
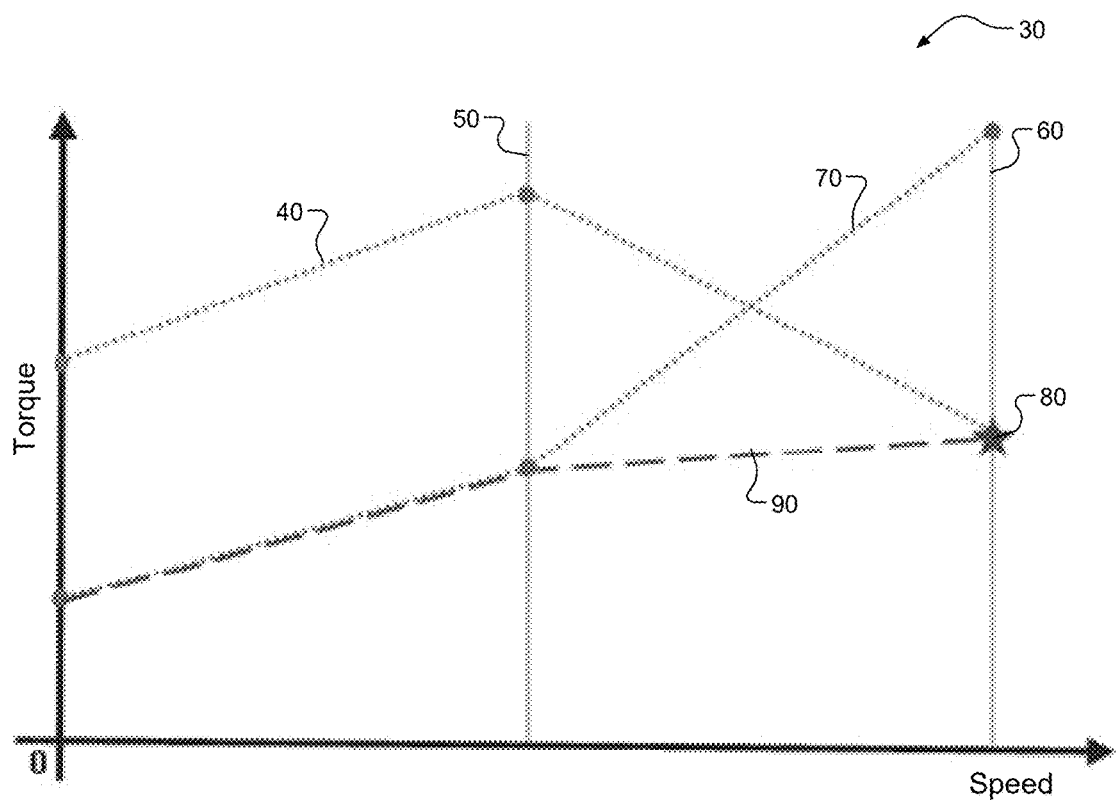

Referring now to FIGS. 1A-1C, plots 10, 20, and 30 of a first example electrified powertrain capability determination and control utilizing torque converter empirical data and a plurality of breakpoints according to the principles of the present application is illustrated. This array consists of maximum torques across the actuator's speeds. FIGS. 1A and 1B, for example, illustrate example plots of maximum engine torque versus engine speed and example motor torque versus motor speed. It will be appreciated that these are merely example plots 10, 20 and that they are not drawn to scale. The collective torque of the torque generating system (the engine plus the electric motor) can be seen by line 40 of plot 30 of FIG. 1C.

This process generally focuses on finding the maximum torque capability of such systems. In these scenarios, the actuator (engine and/or electric motor) torque capability is typically represented as a capability array. Several architectural optimizations are considered when processing the capability array. One such optimization involves performing calculations at the breakpoints, as shown in FIG. 1C by vertical lines 50 and 60, with the assumption that the behavior is linear between these "breakpoints." Essentially, these arrays represent the actuators' nonlinear maximum torque limits as a function of speed, as indicated by the intersection points between the maximum torque capability line 40 and the breakpoints 50 and 60 in FIG. 1C. Torque converter performance characteristics are measured on double ended dynamometer (dyno) or similar device/system and the data collected is used to model the torque converter physics.

An empirical model utilizing lookup table can be used. Impeller and turbine are input and output nodes of the torque converter, where impeller torque ($T_{imp}$) equals a function of impeller speed ($N_{imp}$) and a speed ratio (SR), and the speed ratio SR equals turbine speed ($N_{turb}$) divided by impeller speed $N_{imp}$. Thus, $T_{imp}$ (line 70) is determined empirically at the capability breakpoints as shown in FIG. 1C as shown by the intersection with breakpoints 50 and 60. With these two limits systems maximum limit is determined as shown in FIG. 1C by the dashed line 90 at the breakpoints 50 and 60 and thus the maximum capability point denoted by the star 80. It can be observed that this legacy max torque point does not represent the true systems max capability. This is because the evaluations are only performed at the breakpoints.

Thus, this solution does not accurately capture the torque converter behavior within the breakpoints, leading to potential inaccuracies in identifying the true maximum torque capability. This could result in suboptimal performance during demanding scenarios, as the evaluations were limited to the predefined breakpoints. To overcome the shortcomings of the previous solution and determine the true system maximum capability, this invention utilizes the following new technique of the present application. Firstly, an intersection window is determined. This is the window where the intersection between the actuator (engine+electric motor) and torque converter capabilities takes place. Once the intersection window is determined, the impeller torque $T_{imp}$ is modeled as:

$$T_{imp} = A*Nc^2 + B*Nc + C$$

Here A, B, and C are the polynomial coefficients that model the torque converters $T_{imp}$ as a function of $N_{turb}$. The actuator capability can be represented linearly as:

$$y = m*x + c$$

Here the method determines the straight-line slope (m) and intercepts (c) based on the intersection window found and the actuator capabilities (y) at speed (x).

Figure 2:
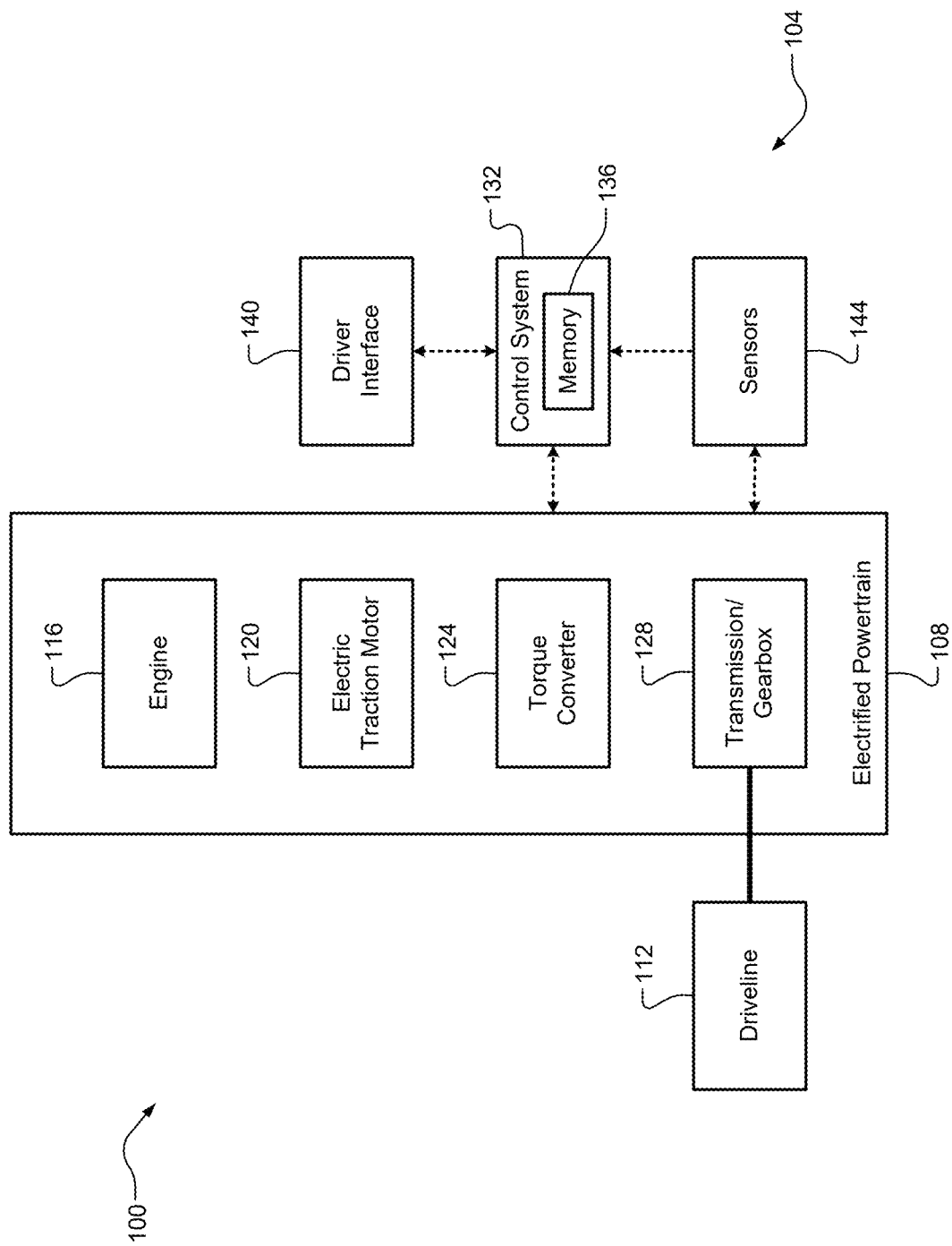
FIG. 2 is a functional block diagram of an electrified vehicle having an electrified powertrain with a torque converter and an example electrified powertrain control system according to the principles of the present application.

Referring now to FIG. 2 and with continued reference to the previous figures, a functional block diagram of an electrified vehicle 100 (or "vehicle 100") having an example electrified powertrain control system 104 (or "powertrain control system 104") according to the principles of the present application is illustrated. While an electrified-configuration of the vehicle 100 is specifically described and shown herein, it will be appreciated that the techniques of the present application could also be applicable to conventional vehicle powertrains having only an engine and a torque converter. The electrified vehicle 100 generally comprises an electrified powertrain 108 (or "powertrain 108") configured to generate and transfer drive torque to a driveline 112 for vehicle propulsion. The electrified powertrain 108 is shown to generally comprise a torque generating system comprising an internal combustion engine 116 and at least one electric traction motor 120, which collectively are connectable in series such that they can both generate torque that is then transferred to the driveline 112 via a torque converter 124 and an optional transmission or gearbox 128. While not explicitly shown, the torque converter 124 can be a fluid coupling type device having an input shaft connected to an impeller blade that fluidly drives a turbine blade connected to an output shaft. It will be appreciated that the electrified powertrain 108 could further include other non-illustrated components, such as a high voltage battery system (for powering the electric traction motor 120), a motor-generator unit (MGU) coupled to the engine 116, and a disconnect clutch for decoupling the engine 116 from the electric traction motor 120 and the torque converter 124

The electrified vehicle 100 is controlled by a control system 132, which primarily controls the electrified powertrain 108 to generate a desired amount of drive torque to satisfy a driver torque request. The control system 132 comprises a memory 136 (either internally or otherwise associated with the control system 132) that is configured to store empirical operation data associated with the operation of the electrified powertrain 108 for improved control of the torque converter 124 according to the new techniques of the present application. The driver torque request can be provided by a driver of the electrified vehicle 100 via a driver interface 140 (e.g., an accelerator pedal), and operating parameters of the electrified powertrain 108 (positions/speeds/accelerations, temperatures, pressures, etc.) are measurable by a plurality of sensors 144 that are configured to measure the various operating parameters. The control system 132 is also configured to perform the techniques of the present application, which will now be discussed in greater detail.

Figure 3:
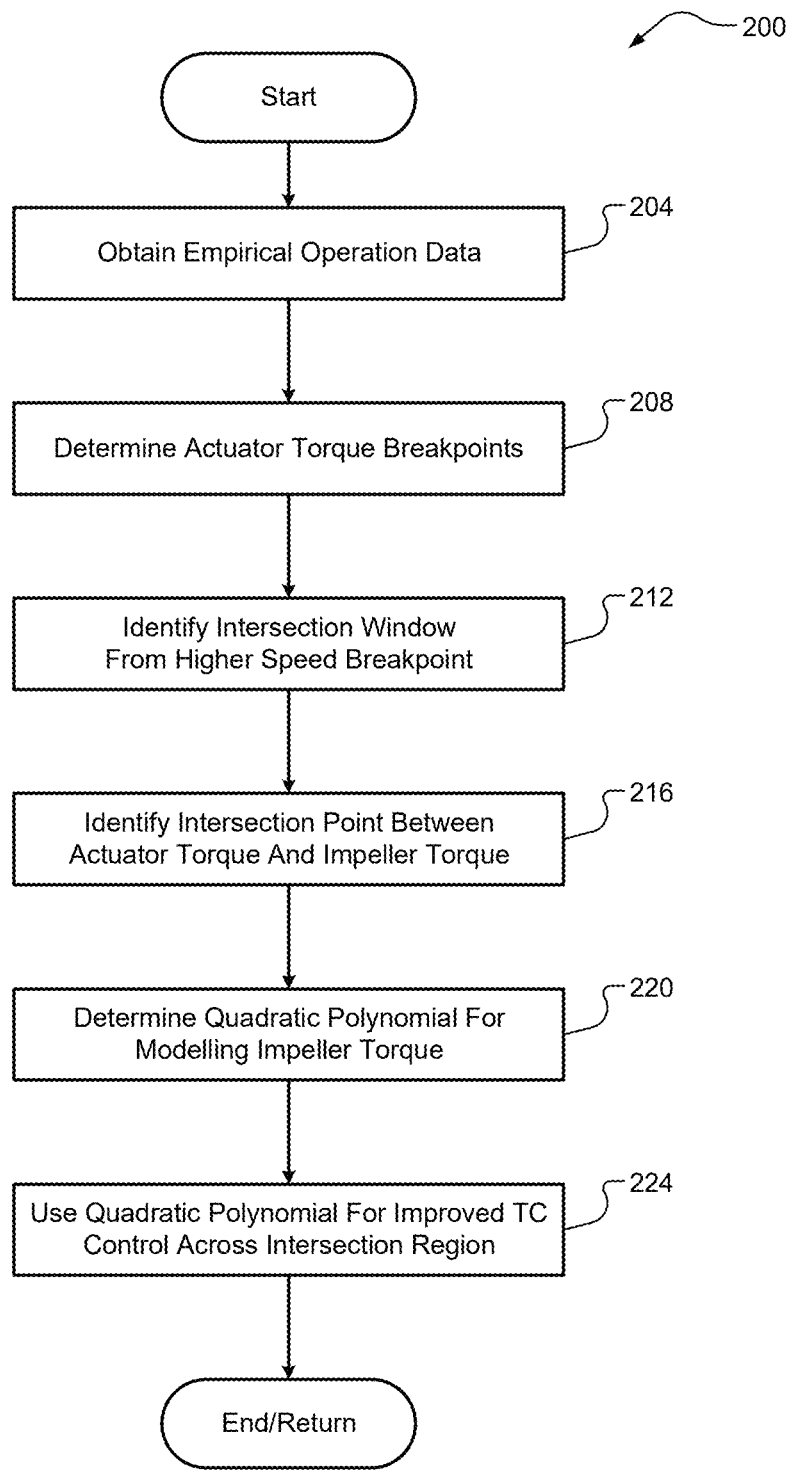
FIG. 3 is a flow diagram of an example control method for an electrified vehicle having an electrified powertrain with a torque converter according to the principles of the present application.
Figure 4:
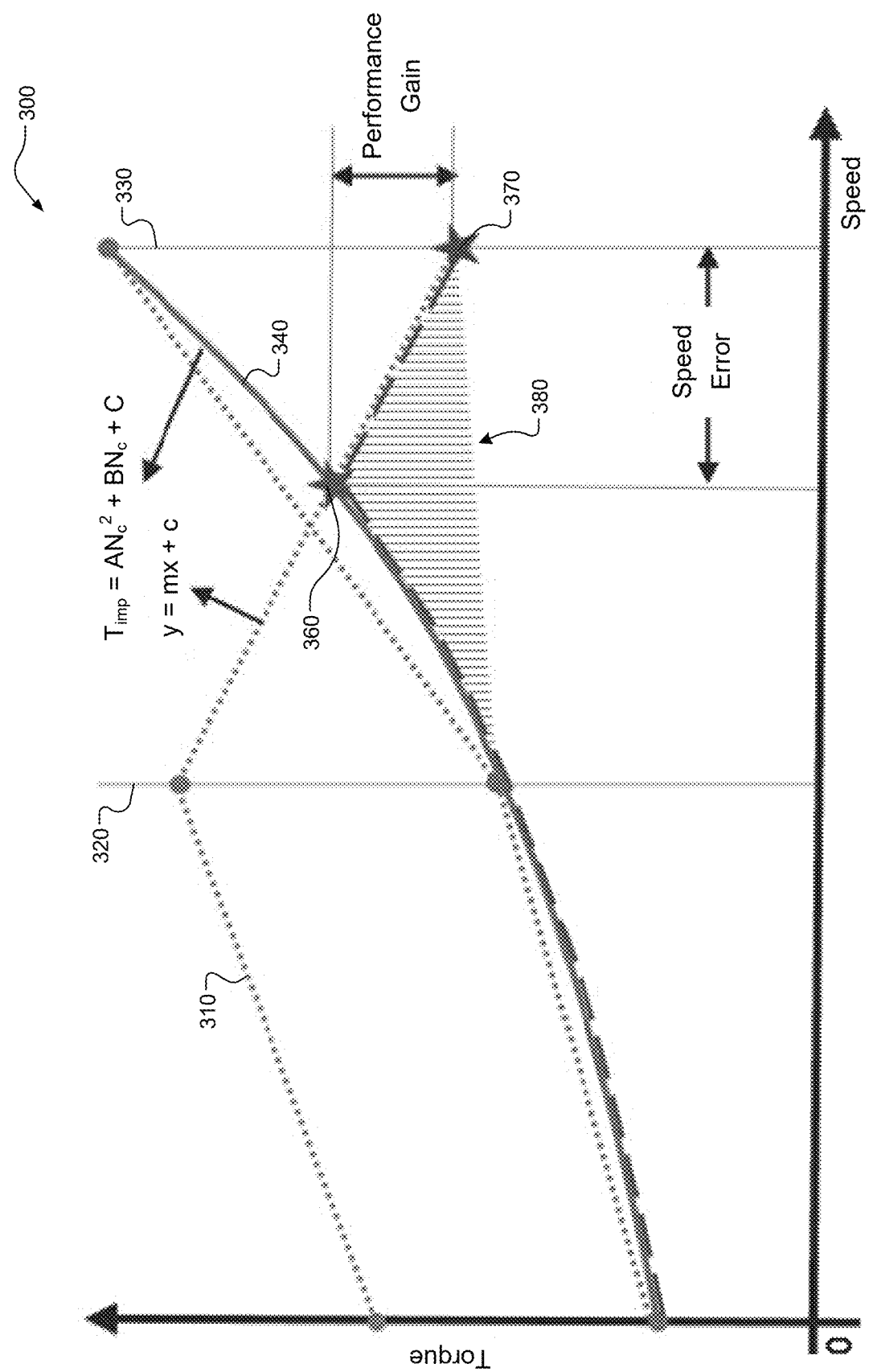
FIG. 4 is a plot of a second example electrified powertrain capability determination and control utilizing torque converter quadratic polynomial modeling according to the principles of the present application.

Referring now to FIGS. 3-4 and with continued reference to the previous figures, a flow diagram of an example electrified powertrain control method 200 and a plot 300 of a second example electrified powertrain capability determination and control utilizing torque converter quadratic polynomial modeling according to the principles of the present application are illustrated. While the method 200 specifically refences the electrified vehicle 100 and its components, it will be appreciated that the method 200 could be applicable to any suitably configured vehicle having an engine and a torque converter. The method 200 begins at 204 where the control system 132 obtains the empirical operation data and stores it at the memory 136. The empirical operation data could have been previously obtained, for example, using a double-ended dyno and then uploaded to the memory 136.

At 208, the control system 132 determines, based on the empirical operation data, maximum torques for the torque generating system (the engine 116 and the electric traction motor 120) at each of a plurality of breakpoints corresponding to different impeller speeds for the torque converter and different speeds of the torque generating system. For simplicity, the plot 300 of FIG. 4 represents two breakpoints 320 and 330 where the intersection between the actuator maximum torque (line 310) and the torque converter maximum torque (line 340) occurs in the second window (between points 320 and 330). At 212, the control system 132 identifies, between two particular breakpoints, (i) a linear intersection point between the maximum torque and the impeller speed for the torque converter 124 and (ii) an intersection region 380 between the two particular breakpoints. The search for the intersection window is optimized by starting from the highest speed breakpoint 330 and moving to the lowest, as the intersection is likely to be near this region due to the physics of the actuators.

By optimizing this search from point 370 corresponding to the higher-speed breakpoint 330, the process is greatly simplified and can be executed much faster. At 216, as previously mentioned, once the intersection window (between breakpoints 320 and 330) is determined, the control system 132 can model the impeller torque $T_{imp}$ (line 340) as a quadratic polynomial at 220 as follows:

$$T_{imp}=A*Nc^2+B*Nc+C \qquad (1).$$

To reiterate, A, B, and C are the polynomial coefficients that model the torque converters $T_{imp}$ as a function of $N_{turb}$. The actuator capability 310 can be represented linearly as:

$$y=m*x+c \qquad (2).$$

Here the method determines the straight-line slope (m) and intercepts (c) based on the intersection window found and the actuator capabilities (y) at speed (x). As shown in FIG. 4, for the intersection window, Equations 1 and 2 above are solved to find the intersection, and hence the maximum system torque capability, denoted by the star 360.

Finally, at 224, the control system 132 can utilize the quadratic polynomial representation of the impeller speed for the torque converter 124 across the intersection region (between breakpoints 320 and 330) for improved control of the electrified powertrain 108. As shown, the shaded area 380 represents the previously unexplored region, which can now be exploited with this invention. FIG. 4 illustrates both the speed error (compared to the previous solution of FIG. 1C) and the performance can that is achievable using this new method for modeling and determining torque converter maximum torque. It can be observed that the improved maximum torque is significantly higher than the legacy maximum torque, resulting in enhanced performance and efficiency. This invention therefore introduces a significant advancement over previous methods by accurately determining the true system maximum torque capability, considering both the torque converter and actuator constraints. The key innovations and differences are as follows.

Unlike previous solutions that relied solely on empirical data and capability curves evaluated at discrete breakpoints, this invention integrates the torque converter characteristics with the engine and motor torque capabilities. This comprehensive approach ensures a more accurate representation of the system's performance. The invention also addresses the complex and dynamic interactions between the torque converter and the actuators, which were not captured in previous methods. By modeling the impeller torque $T_{imp}$ as a quadratic function and the actuator capability as a linear function, the method accurately identifies the intersection point, representing the true maximum torque capability. The search for the intersection window is optimized by starting from the highest speed breakpoint and moving to the lowest. This optimization leverages the physical behavior of the actuators, making the process more efficient and likely to find the true maximum torque region.

That is, this efficiency improvement is for embedded controllers, where its crucial as the available processor (e.g., centra processor, or CPU) computational resources are limited, and these techniques allow us to exploit more CPU computational throughput with limited resources. Lastly, by solving for the intersection of the quadratic and linear equations, the invention identifies the maximum system torque capability, which is significantly higher than the legacy maximum torque (see, e.g., step 360 versus step 370 in FIG. 4). This leads to improved performance and efficiency, especially in demanding scenarios where the previous methods fell short.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A powertrain control system for a vehicle, the powertrain control system comprising:
    a memory configured to store empirical operation data for a powertrain of the vehicle, the powertrain comprising a torque generating system including (i) at least one of an electric traction motor and (ii) an engine connectable in series at an input of a torque converter; and
    a control system configured to:
        determine, based on the empirical operation data, maximum torques for the torque generating system at each of a plurality of breakpoints corresponding to different impeller speeds for the torque converter and different speeds of the torque generating system, wherein each breakpoint of the plurality of breakpoints corresponds to a change in a slope of the maximum torque for the torque generating system;
        identify, between two particular breakpoints, (i) a linear intersection point between the maximum torque for the torque generating system and the impeller speed for the torque converter and (ii) an intersection region between the two particular breakpoints;
        determine a quadratic polynomial representation of the impeller speed for the torque converter across the intersection region based on the empirical operation data for the torque converter; and
        utilize the quadratic polynomial representation of the impeller speed for the torque converter across the intersection region to control the powertrain.

2. The powertrain control system of claim 1, wherein the control system is further configured to determine coefficients for the quadratic polynomial representation based on the empirical operation data for the powertrain.

3. The powertrain control system of claim 2, wherein the control system is further configured to determine the linear intersection point from the particular breakpoint corresponding to a higher speed of the torque generating system.

4. The powertrain control system of claim 2, wherein the empirical operation data is obtained via dynamometer testing of the vehicle.

5. The powertrain control system of claim 1, wherein the improved control of the powertrain includes greater torque of the torque generating system compared to an assumption of linear behavior of the torque generating system between each of the plurality of breakpoints.

6. The powertrain control system of claim 1, wherein the control system is further configured to increase both the impeller speed for the torque converter and a torque output of the torque generating system across the intersection region.

7. The powertrain control system of claim 1, wherein the torque generating system comprises the engine and at least two electric traction motors.

8. The powertrain control system of claim 1, wherein the plurality of breakpoints comprises only the two particular breakpoints.

9. The powertrain control system of claim 1, wherein the control system does not utilize a complete model of the torque converter.

10. A powertrain control method for a vehicle, the powertrain control method comprising:
    storing, by a memory associated with a control system of the vehicle, empirical operation data for a powertrain of the vehicle, the powertrain comprising a torque generating system including (i) at least one of an electric traction motor and (ii) an engine connectable in series at an input of a torque converter;
    determining, by the control system and based on the empirical operation data, maximum torques for the torque generating system at each of a plurality of breakpoints corresponding to different impeller speeds for the torque converter and different speeds of the torque generating system, wherein each breakpoint of the plurality of breakpoints corresponds to a change in a slope of the maximum torque for the torque generating system;
    identifying, by the control system and between two particular breakpoints, (i) a linear intersection point between the maximum torque for the torque generating system and the impeller speed for the torque converter and (ii) an intersection region between the two particular breakpoints;
    determining, by the control system, a quadratic polynomial representation of the impeller speed for the torque converter across the intersection region based on the empirical operation data for the torque converter; and
    utilizing, by the control system, the quadratic polynomial representation of the impeller speed for the torque converter across the intersection region to control the powertrain.

11. The powertrain control method of claim 10, further comprising determining, by the control system, coefficients for the quadratic polynomial representation based on the empirical operation data for the powertrain.

12. The powertrain control method of claim 11, further comprising determining, by the control system, the linear intersection point from the particular breakpoint corresponding to a higher speed of the torque generating system.

13. The powertrain control method of claim 11, wherein the empirical operation data is obtained via dynamometer testing of the vehicle.

14. The powertrain control method of claim 10, wherein the improved control of the powertrain includes greater torque of the torque generating system compared to an assumption of linear behavior of the torque generating system between each of the plurality of breakpoints.

15. The powertrain control method of claim 10, further comprising increasing, by the control system, both the impeller speed for the torque converter and a torque output of the torque generating system across the intersection region.

16. The powertrain control method of claim 10, wherein the torque generating system comprises the engine and at least two electric traction motors.

17. The powertrain control method of claim 10, wherein the plurality of breakpoints comprises only the two particular breakpoints.

18. The powertrain control method of claim 10, wherein the control system does not utilize a complete model of the torque converter.

\* \* \* \* \*